April 15, 1969  A. P. BENTLEY  3,438,284
REDUCTION GEAR TRANSMISSION
Filed June 17, 1966  Sheet 1 of 3

INVENTOR
ARTHUR P. BENTLEY
BY Robert C. Sullivan
ATTORNEY

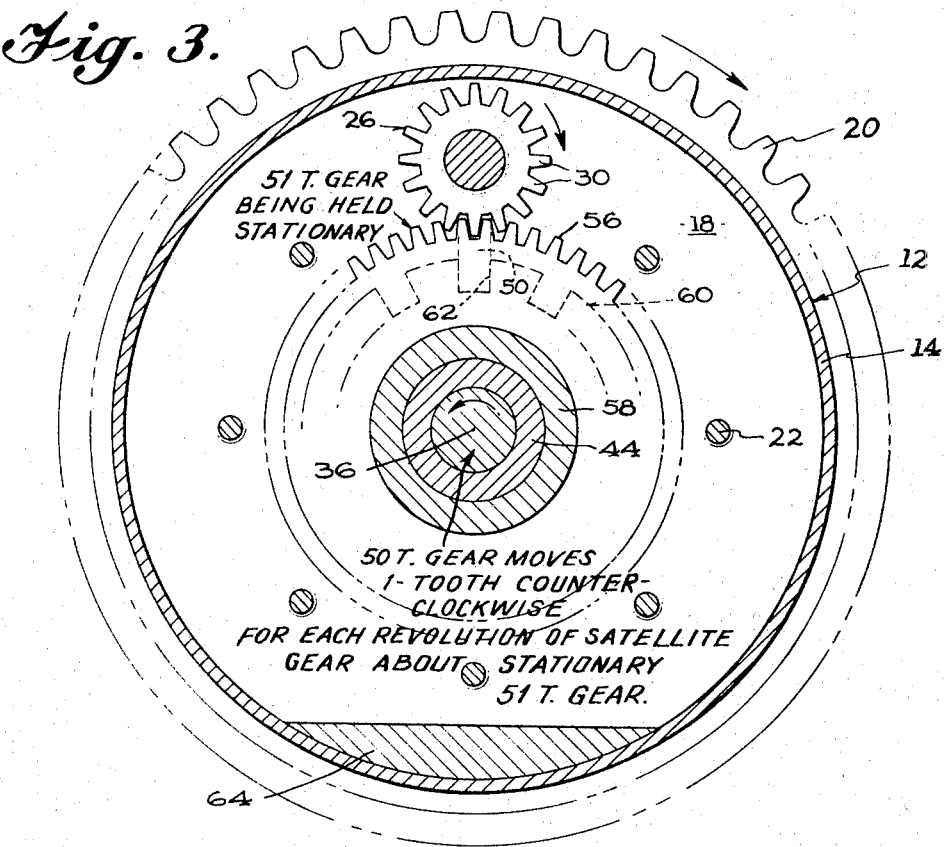
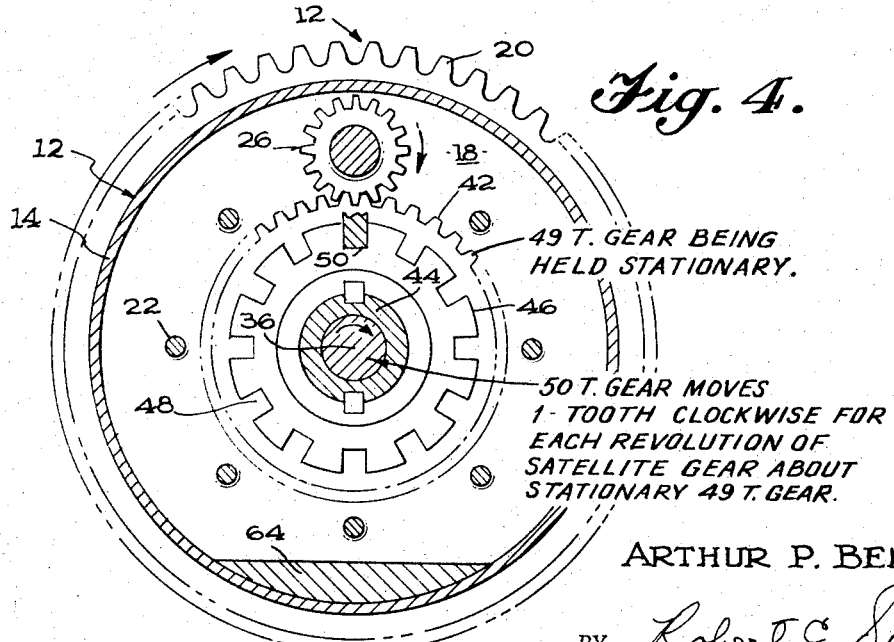

United States Patent Office 3,438,284
Patented Apr. 15, 1969

3,438,284
REDUCTION GEAR TRANSMISSION
Arthur P. Bentley, Capitan, N. Mex.
(Box 139, Boerne, Tex. 78006)
Filed June 17, 1966, Ser. No. 558,300
Int. Cl. F16h 57/10
U.S. Cl. 74—766                              1 Claim

ABSTRACT OF THE DISCLOSURE

A gear reduction unit comprising an output shaft having a first gear fixed thereto, and second and third gears loosely mounted on the output shaft. There is a differential between the number of teeth on the first gear and on the second and third gears in accordance with which the second gear has fewer teeth than the first gear and the third gear has more teeth than the first gear. A satellite gear is mounted for rotation in meshed engagement with the first, second, and third gears. Means is provided to selectively hold one or the other of the second and third gears stationary to thereby selectively cause forward or reverse rotation of the first gear and the output shaft in proportion to the differential between the number of teeth of the first gear and the number of teeth of the gear which is being held stationary.

---

This invention relates to reduction gear transmissions and more particularly to a high torque gear reduction which operates upon the differential principle to provide either a forward or a reverse rotation of an output shaft, or which may be used to provide only one direction of rotary output motion, in accordance with the particular requirements.

It is an object of this invention to provide a gear reduction unit which is capable of producing a high torque output.

It is another object of the invention to provide a reduction gear unit which incorporates means for operating the output shaft of the unit in either a forward or reverse direction by a differential action.

In achievement of these objectives, there is provided in accordance with an embodiment of this invention a gear reduction unit which operates upon the differential principle and includes a fixed gear mounted upon an output shaft and having, for example, 50 teeth. Second and third gears respectively having, for example, 49 and 51 teeth, are loosely mounted on the output shaft adjacent the fixed 50-tooth gear. A locking means is provided to selectively hold either the 49-tooth gear or the 51-tooth gear stationary relative to the support on which the gear reduction unit is mounted. Means such as a housing including a pair of spaced discs is mounted for rotation about the output shaft and supports a satellite gear in meshed engagement with all three of the gears mounted on the output shaft. If the 49-tooth gear is held stationary, the 50-tooth gear fixed to the output shaft is caused to rotate one tooth distance in a forward direction for each complete rotation of the satellite gear about the stationary 49-tooth gear, to give a 50:1 reduction between input speed and output speed. If the 51-tooth gear is held stationary, the 50-tooth gear fixed to the output shaft is caused to rotate one tooth distance in a reverse direction for each complete rotation of the satellite gear about the 51-tooth gear, to also give a 50:1 reduction between the input speed and the output speed. If only one direction of output motion is required in a given gear reduction unit, then only one of the loosely mounted gears need be provided, such as the 49-tooth gear, for example, which provides forward motion. Almost any desired step-down ratio may be obtained by suitably varying the number of teeth on the various gears and/or by suitably varying the differential between the number of teeth on the gear which is fixed to the output shaft and the gear or gears loosely mounted on the output shaft but selectively held stationary by the locking means.

Further objects and advantages of the invention will become apparent from the following description taken in conjunction with the accompanying drawings in which:

FIG. 3 is a view in transverse section taken along line 3—3 of FIG. 1; and

FIG. 4 is a composite transverse section showing the 49-tooth gear being held stationary.

Figure 1:
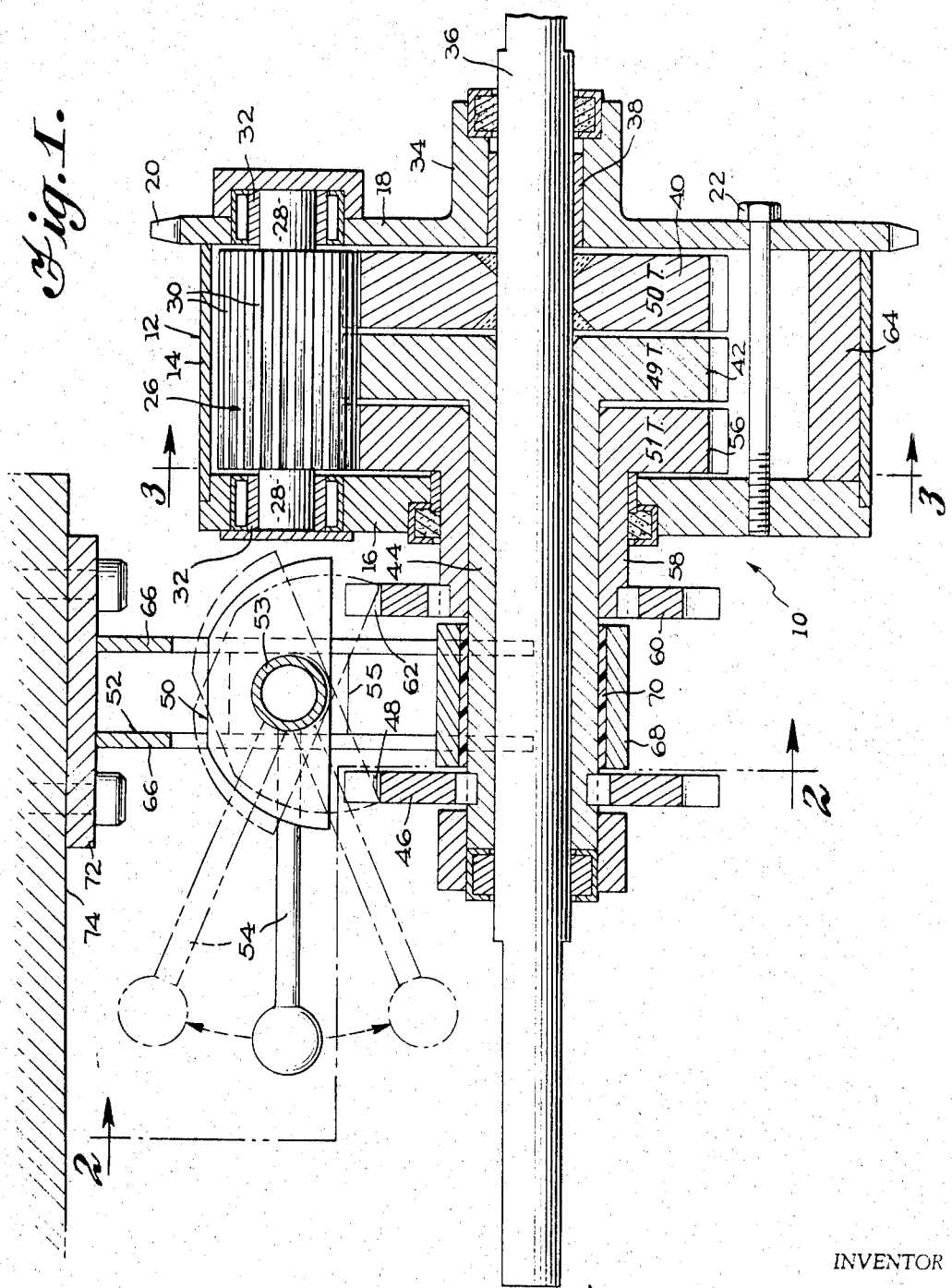
FIG. 1 is a view in longitudinal section of a gear reduction unit in accordance with the invention.
Figure 2:
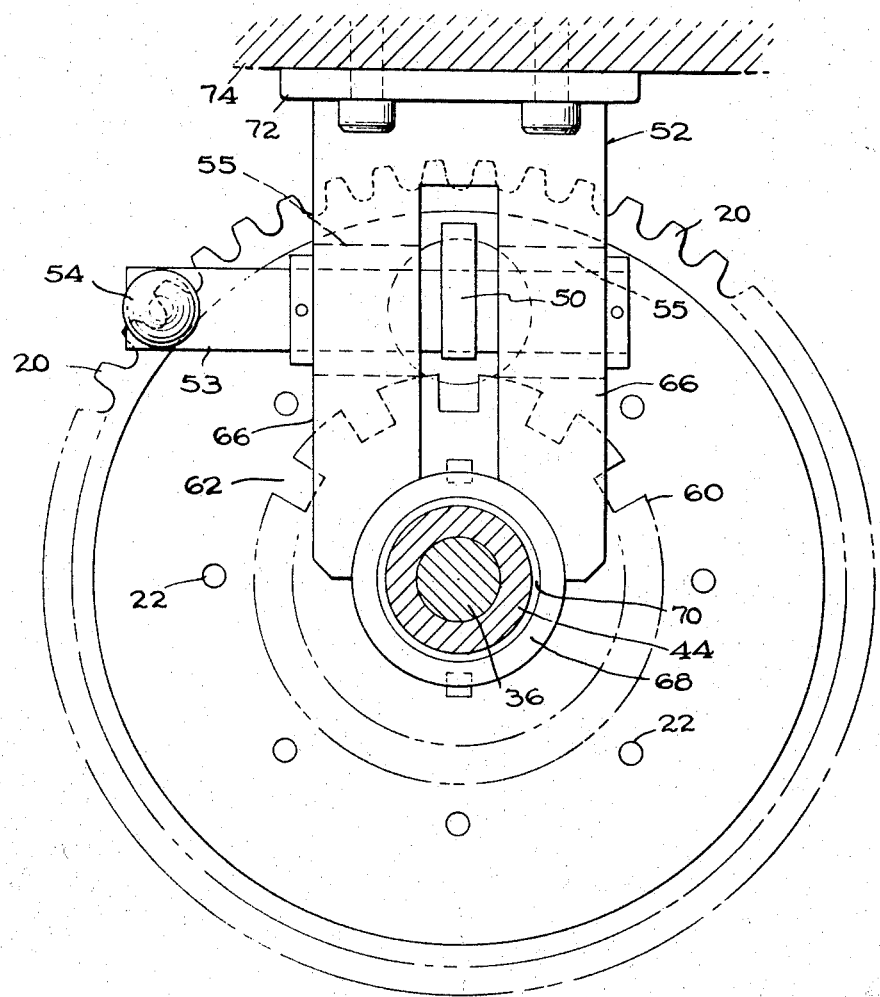
FIG. 2 is a view in transverse section taken along line 2—2 of FIG. 1.

Referring now to the drawings, there is shown a gear reduction unit generally indicated at 10, comprising a generally cylindrical housing generally indicated at 12. Housing 12 includes a cylindrical body portion 14 closed at opposite ends thereof by end plates or discs 16 and 18. End plate 18 is provided around the outer periphery thereof with sprocket teeth 20 which permit housing 12 to be rotatably driven by a drive chain from a suitable source of input power. Plates 16 and 18 are suitably secured together to hold housing 12 in assembled relation, as by a plurality of bolt members 22 which pass through cover plate 18 and have threaded ends which are in threaded engagement with plate 16. The opposite plates 16 and 18 are also suitably bored adjacent a radially outer portion of each end plate to receive the opposite ends 28 of a satellite or planet gear generally indicated at 26. Satellite gear 26 is provided around its entire periphery with spur teeth 30 which extend for an axial distance just slightly less than the distance between the inner facing walls of plates 16 and 18 to permit satellite gear 26 to mesh with the three spur gears 40, 42 and 56 to be described. Suitable bearings 32 are provided for the opposite ends 28 of satellite gear 26. While all of the gears 26, 40, 42 and 56 are shown and described as spur gears, these gears need not necessarily be of the spur type but could be helical or herringbone gears, for example.

Cover plate 18 of housing 12 is provided with an integral longitudinal tubular extension 34 which forms a bearing housing for one end of the output shaft generally indicated at 36. Suitable bearings means 38 in bearing housing 34 support one end of shaft 36 for rotation.

A spur gear 40 which, in the illustrated embodiment, is provided with 50 teeth around its periphery, is rigidly secured, as by welding, to shaft 36 within housing 12 and adjacent the inner wall surface of cover plate 18.

A second spur gear 42 having, in the illustrated embodiment, one less tooth than gear 40, and thus having 49 teeth spaced equally about its periphery, is locally mounted on output shaft 36 next to gear 40 within housing 12. Gear 42 is provided with an integral elongated tubular extension or sleeve 44 which serves as a bearing for shaft 36.

Adjacent the outer or left-hand end of tubular sleeve 44 of gear 40, with respect to the view of FIG. 1, there is suitably keyed or otherwise rigidly attached a disc or plate member 46 having a plurality of circumferentially spaced notches 48 therein which are adapted to cooperate with a pivotally movable dog member generally indicated at 50. Dog 50 is attached to a pivotally movable shaft 53 which is suitably supported for pivotal movement in bearing means 55 mounted on the bracket structure generally indicated at 52, to be hereinafter described. Bracket structure 52 is rigid and non-movable with respect to the apparatus or other support on which the gear reduction unit is mounted.

As best seen in FIG. 1, dog 50 may be pivotally moved by operation of handle or lever 54 attached to the shaft 53 on which the dog 50 is mounted to cause the dog to engage one of the notches 48 of plate 46 to thereby hold gear 42 stationary when desired, as will be hereinafter explained.

A third spur gear, indicated at 56, is loosely mounted on the outer surface of tubular extension 44 of gear 42. In the illustrated embodiment, gear 56 has one more tooth than gear 40, and thus is provided with 51 spur teeth spaced equally about its periphery. Gear 56 is provided with a tubular extension or sleeve 58 which is coaxial with respect to sleeve 44 of gear 42 and lies radially outwardly thereof. A disc or plate 60 is keyed or otherwise rigidly secured to tubular extension 58 of gear 56. Disc 60 is similar to disc 46, previously described, and is provided with a plurality of circumferentially spaced notches 62 which are adapted to receive the pivotally movable locking dog 50, whereby when the notches 62 of disc 60 are engaged by locking dog 50 the 51-tooth gear 56 is held stationary. Thus, by means of pivotally movable dog 50, either one of the other of the gears 42 or 56 may be held stationary relative to support 74.

All three of the gears 40, 42, and 56 are in meshing engagement with the satellite gear 28, and all are of the same outer diameter. Proper rolling contact between the satellite or planet gear 26 and each of the gears 40, 42, and 56 is obtained by varying the tooth depth of each of the respective gears 40, 42 and 56. All of the gears 26, 40, 42, and 56 are of the same pitch.

In an operating model of the gear reduction unit which has been successfully tested, gears having the following characteristics were used:

Satellite gear 26:
  16 teeth
  1.800 inch outer diameter
  1.600 inch pitch diameter
  Teeth are .220 inch deep
  10 pitch
Gear 40 (rigid with shaft 36):
  50 teeth
  10 pitch
  Teeth are .220 inch deep
Gear 42:
  49 teeth
  10 pitch
  Teeth are .230 inch deep
Gear 56:
  51 teeth
  10 pitch
  Teeth are .210 inch deep The tooth depth in each case is the depth measured from the outer diameter or addendum circle of the respective gear to the root circle of the respective gear, where the addendum circle is the circle bounding the tops of the teeth and the root circle is the circle bounding the bottoms of the teeth.

In order to balance the weight of the satellite gear 26 which is supported adjacent one diametric end of housing 12, a counterweight 64 is suitably mounted within housing 12 diametrically opposite the location of satellite gear 26. The weight of counterweight 64 is made such as to balance the weight of satellite gear 26.

In the operation of the gear reduction unit, if the locking dog 50 is moved in a counterclockwise direction with respect to the view shown in FIG. 1 to engage the notch 48 of disc 46, the 49-tooth gear 42 is held stationary. As best seen in the view of FIG. 4, assuming that the housing 12 with sprocket teeth 20 thereon is being rotated in a clockwise direction, the satellite gear 26, carried by housing 12, is of course also moving in a clockwise direction along with housing 12 and, at the same time, is rolling along in mesh with the 49-tooth gear 42, satellite gear 26 rotating about its own axis in a clockwise direction with respect to the view of FIG. 4, as it rotates along the stationary 49-tooth gear 42. This provides a differential action which causes the 50-tooth gear 40, fixed to shaft 36, to move one tooth clockwise or in a forward direction, with respect to the view of FIG. 4, for each revolution of satellite gear 26 about the stationary 49-tooth gear 42.

If the locking dog 50 is moved in a clockwise direction with respect to the view shown in FIG. 1 to engage the notch 62 of plate 60, the 51-tooth gear 56 is held stationary and satellite gear 26 rotates around the stationary gear 56 as the housing 12 is rotated by means of a drive chain or the like. Thus, as seen in the view of FIG. 3, assuming that the housing 12 with sprocket teeth 20 thereon is being rotated in a clockwise direction, the satellite gear 26 carried by housing 12 moves in a clockwise direction along with housing 12 and, at the same time, rolls along the 51-tooth gear 56 in meshing engagement therewith, satellite gear 26 rotating about its own axis in a clockwise direction as it rotates along the stationary 51-tooth gear 56. This provides a differential action which causes the 50-tooth gear 40, fixed to shaft 36, to move one tooth counterclockwise or in a reverse direction, with respect to the view of FIG. 3, for each revolution of satellite gear 26 about stationary 51-tooth gear 56.

Thus, it will be seen that by selectively pivotally moving the locking dog 50 into engagement with the notch 48 of the plate 46 to lock the 49-tooth gear against rotation, or, alternatively, by moving the dog 50 into engagement with a notch 62 of plate 60 to lock the 51-tooth gear 56 against rotation, the output shaft 36 may be caused to move either in a clockwise or forward direction, as seen in FIG. 4, or in a counterclockwise or reverse direction, as seen in FIG. 3. In either case, the same 50:1 reduction ratio is provided between the rotary speed of housing member 12 and the output rotary speed of shaft 36.

Gear reduction unit 10 is supported with respect to the machine or other surface on which it is mounted by means of support bracket generally indicated at 52 which includes spaced legs 66 which are secured, as by welding, to a sleeve member 68 which surrounds the integral tubular extension 44 of gear 42, with a nylon bushing 70 or the like being interposed between the surfaces of the tubular extension 44 and the sleeve 68. The upper ends of bracket arms 66, with respect to the view shown in FIG. 1 are rigidly secured to a plate member 72 which, in turn, is suitably secured to the mounting surface 74 which may be part of the machine with which the reduction gear unit is associated, or other suitable support surface. The shaft 53 on which dog 50 is mounted is suitably pivotally supported by bearing means 55 carried by the legs 66 of bracket structure 52.

While the means for selectively holding the gears 42 and 56 stationary has been illustrated as a pivotally movable dog which selectively cooperates with plates 48 and 62, obviously other suitable means may be provided for selectively holding the gears 42 or 56 in a stationary position. For example, suitable clutch means such as dry or wet multiple plate or single plate clutches, or an internal or external brake band type of clutch may be used instead of dog 50 and cooperating plates 46 and 60.

While the invention has been illustrated in connection with gears which provide a 50:1 ratio between input and output, almost any desired ratio may be obtained by suitable selection of the number of teeth on the various gears and by suitable selection of the differential between the number of teeth on the gear which is fixed to the output shaft and the number of teeth on the loosely mounted gear or gears which may be selectively held locked in stationary position. For example, the gear 40 which is fixed to the shaft might have 50 teeth while the gears 42 and 56 might respectively have 48 teeth and 52 teeth to provide a 25:1 reduction in both forward and reverse directions of operation. If only a single direction of rotation of output shaft 36 is required only one of the gears 42 or 56 need be provided in combination with the fixed 50-tooth gear 40. For example, if only the 49-tooth gear 42 is provided in combination with the fixed 50-tooth gear 40, then a 50:1 reduction will be provided with the output shaft 36 rotating in a clockwise or forward direction. If instead of being provided with 49 teeth, gear 42 is instead provided with 48 teeth, still in combination with the 50-tooth gear 40, then a 25:1 reduction will be provided. Similarly, if fixed gear 40 is provided with 100 teeth and the gears 42 and 56 are respectively provided with 99 teeth and 101 teeth, then a reduction ratio of 100:1 will be provided in both forward and reverse directions of rotation of shaft 36.

A further reduction may be provided by suitably selecting the reduction ratio between the prime mover and the input sprocket formed on end plate 18.

While there has been shown and described a particular embodiment of the invention, it will be obvious to those skilled in the art that various changes may be made therein without departing from the invention and, therefore, it is aimed to cover all such changes as fall within the true spirit and scope of the invention.

What I claim as my invention is:

1. A gear reduction unit comprising an output shaft, a first gear fixed to said output shaft, second and third gears loosely mounted on said output shaft, a satellite gear, said first, second, and third gears and said satellite gear each being provided with gear teeth on the outer periphery thereof, said satellite gear being of uniform diameter throughout the extent of the gear teeth thereon with the teeth being continuous in said extent, support means mounting said satellite gear in meshed engagement with said first, second, and third gears for rotation in a path concentric with said drive shaft, said support means being a housing rotatable about said output shaft, said first, second and third gears being enclosed within said housing, there being a differential between the number of teeth on said first gear and on said respective second and third gears in accordance with which said second gear has fewer teeth than said first gear and said third gear has more teeth than said first gear, each of said first, second, and third gears having the same outer diameter, said first, second and third gears having different tooth depths whereby to obtain proper rolling contact between said satellite gear and the respective first, second, and third gears, a tubular sleeve extending axially from each of said second and third gears and coaxially assembled about said output shaft, a circular plate drivably carried by each of said sleeves with each plate having notches in the periphery, said plates being spaced apart axially of said sleeves, a locking dog rockably mounted on an axis transverse of said sleeve and substantially midway between said plates, said dog comprising a circular segment greater than a semi-circle and defined by an arc and a straight edge, said straight edge being selectively engageable with a notch in one of said plates by rocking of said dog whereby the gear connected to the engaged plate is held stationary, rotation of said housing causing said satellite gear to rotate about the one of said gears which is being held stationary, whereby a rotary movement is imparted to said first gear and to said output shaft in proportion to the differential between the number of teeth of said first gear and the number of teeth of the gear which is being held stationary, said output shaft being rotated in one direction of rotation when said second gear is being held stationary and in an opposite direction of rotation when said third gear is being held stationary.

References Cited

UNITED STATES PATENTS

| 1,009,954 | 11/1911 | de Briones | 74—788 |
| 1,268,131 | 6/1918 | Ledwinka | 74—168 |
| 1,435,821 | 11/1922 | Dorsey | 74—802 X |
| 1,723,327 | 8/1929 | Bronander | 74—768 |
| 1,777,490 | 10/1930 | Hardie | 74—802 |
| 1,951,424 | 3/1934 | Lewis | 74—802 |
| 2,794,350 | 6/1957 | Hart | 74—766 |
| 2,888,840 | 6/1959 | Witzel | 74—766 X |

FOREIGN PATENTS

| 9,961 | 9/1955 | Germany. |
| 783,099 | 9/1957 | Great Britain. |

OTHER REFERENCES

Logue, Charles H.: American Machinist Gear Book, McGraw-Hill, 1922, pp. 20–21

DONLEY J. STOCKING, *Primary Examiner.*

T. C. PERRY, *Assistant Examiner.*